United States Patent
Dahl et al.

(10) Patent No.: US 9,436,321 B2
(45) Date of Patent: Sep. 6, 2016

(54) TOUCHLESS INTERACTION DEVICES

(71) Applicant: Elliptic Laboratories AS, Oslo (NO)

(72) Inventors: Tobias Gulden Dahl, Oslo (NO); Hans Jørgen Bang, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 0 days.

(21) Appl. No.: 14/248,647

(22) Filed: Apr. 9, 2014

(65) Prior Publication Data

US 2014/0306936 A1    Oct. 16, 2014

(30) Foreign Application Priority Data

Apr. 10, 2013 (GB) .................................. 1306475.3

(51) Int. Cl.
*G06F 3/043* (2006.01)
*G06F 3/01* (2006.01)

(52) U.S. Cl.
CPC ............. *G06F 3/0436* (2013.01); *G06F 3/017* (2013.01); *G06F 2203/04108* (2013.01)

(58) Field of Classification Search
USPC ......................................................... 345/177
See application file for complete search history.

(56) References Cited

U.S. PATENT DOCUMENTS

| | | | |
|---|---|---|---|
| 2002/0126104 A1* | 9/2002 | Knowles ............... | G06F 3/0436 345/177 |
| 2007/0115758 A1* | 5/2007 | Kojima .................. | G01S 7/521 367/197 |
| 2008/0198145 A1* | 8/2008 | Knowles ................ | G06F 3/043 345/177 |
| 2010/0289740 A1* | 11/2010 | Kim ....................... | G04G 21/04 345/157 |
| 2011/0096954 A1* | 4/2011 | Dahl ............................. | 382/103 |
| 2011/0234545 A1* | 9/2011 | Tanaka et al. ................ | 345/177 |
| 2012/0206339 A1* | 8/2012 | Dahl ....................... | G06F 3/043 345/156 |
| 2012/0230517 A1* | 9/2012 | Lee .............................. | 381/120 |
| 2014/0104196 A1* | 4/2014 | Haungs ................... | G06F 3/041 345/173 |

FOREIGN PATENT DOCUMENTS

WO    WO 2011004135 A1 *    1/2011
WO    WO 2012028884 A1 *    3/2012

* cited by examiner

*Primary Examiner* — Jason Olson
*Assistant Examiner* — Deeprose Subedi
(74) *Attorney, Agent, or Firm* — Beyer Law Group LLP

(57) ABSTRACT

An electronic device comprises a front surface comprising a display screen; a rear surface; at least one ultrasonic transmitter; and at least one ultrasonic receiver. The device may be configured to transmit signals from the transmitter and to receive the signals at the receiver after reflection from an input object and to use the reflected signals to characterise the motion of said input object for controlling a function of the device. At least one of the ultrasonic transmitter and the ultrasonic receiver is disposed on the rear surface of the device. The device may be configured to transmit signals from the transmitter and to receive the signals at the receiver after reflection from a user's hand and to use the reflected signals to detect one of a predetermined set of gestures carried out adjacent to the device when the device is placed on its rear surface on a flat supporting surface.

18 Claims, 10 Drawing Sheets

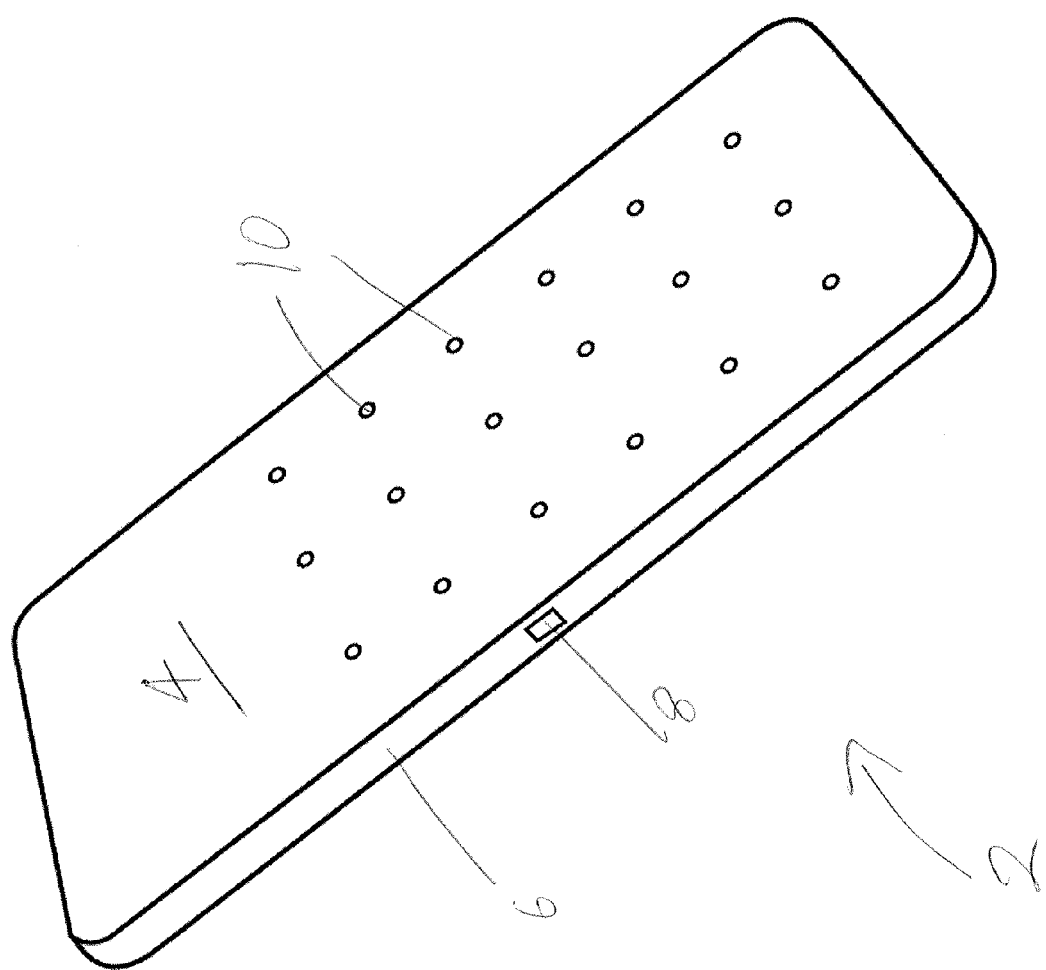

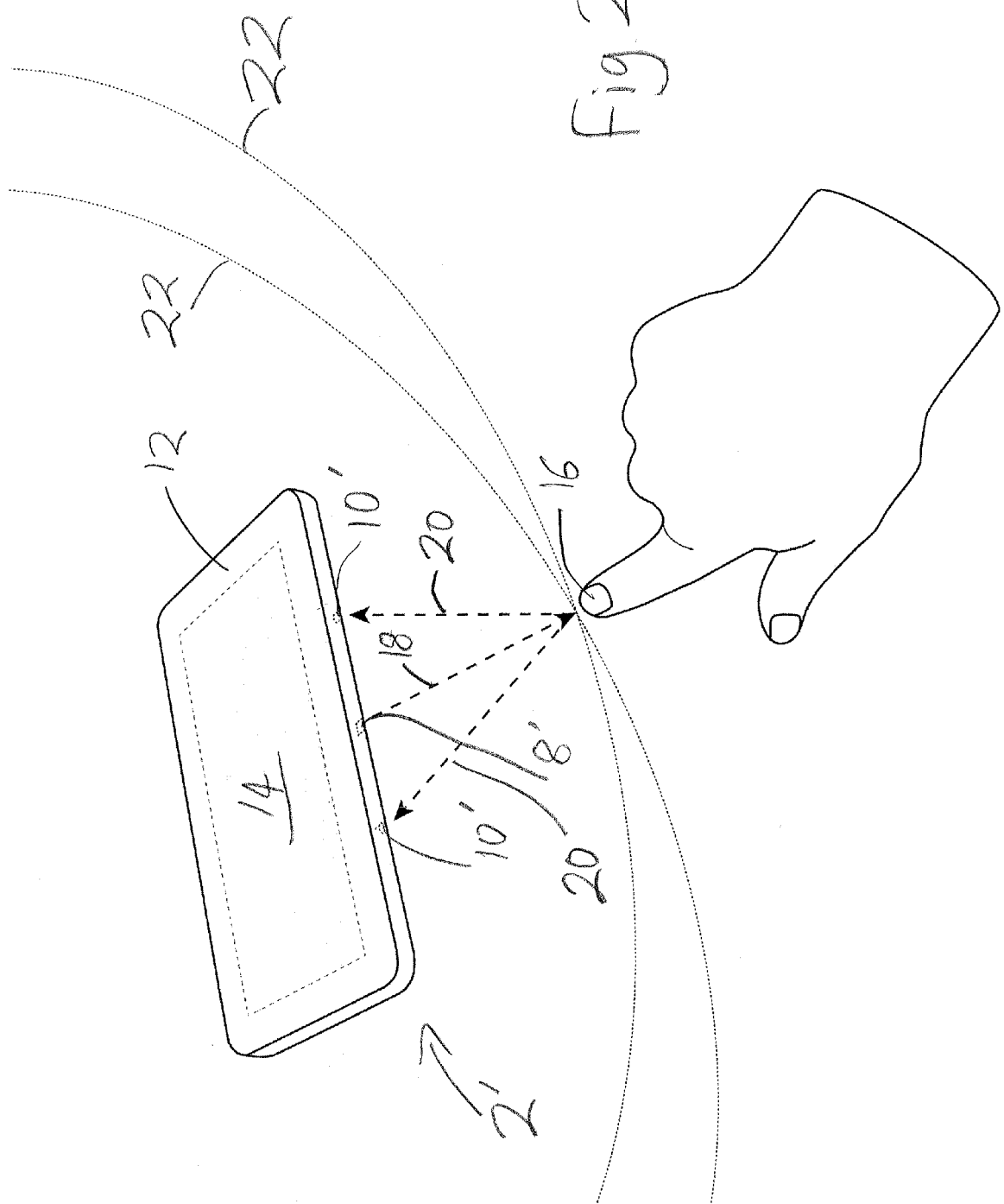

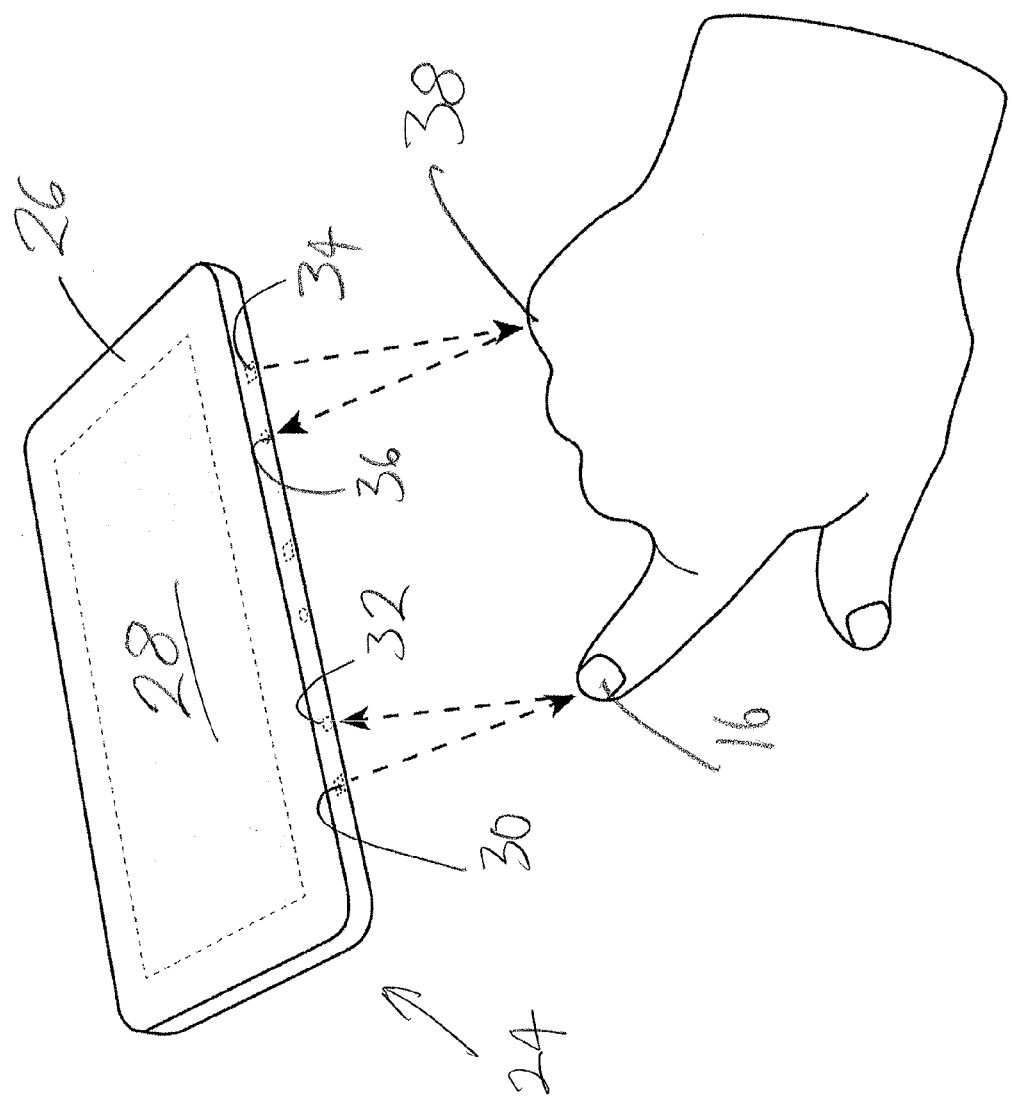

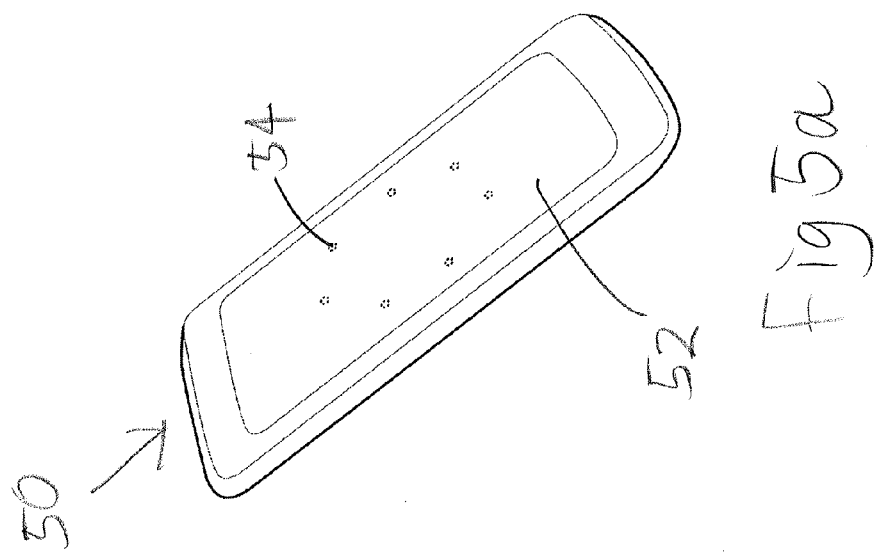
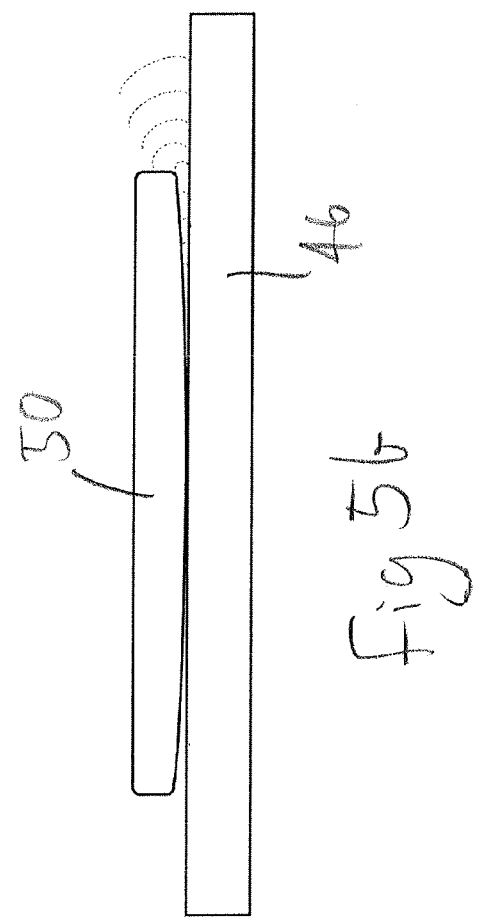

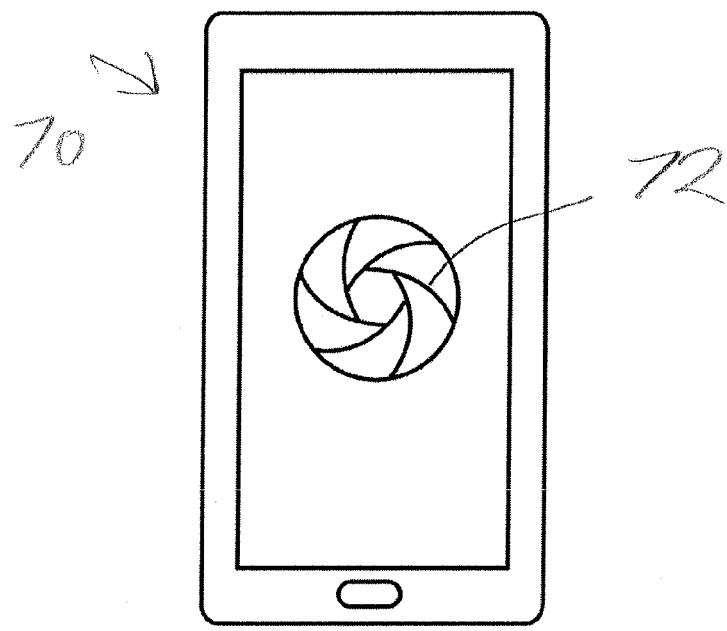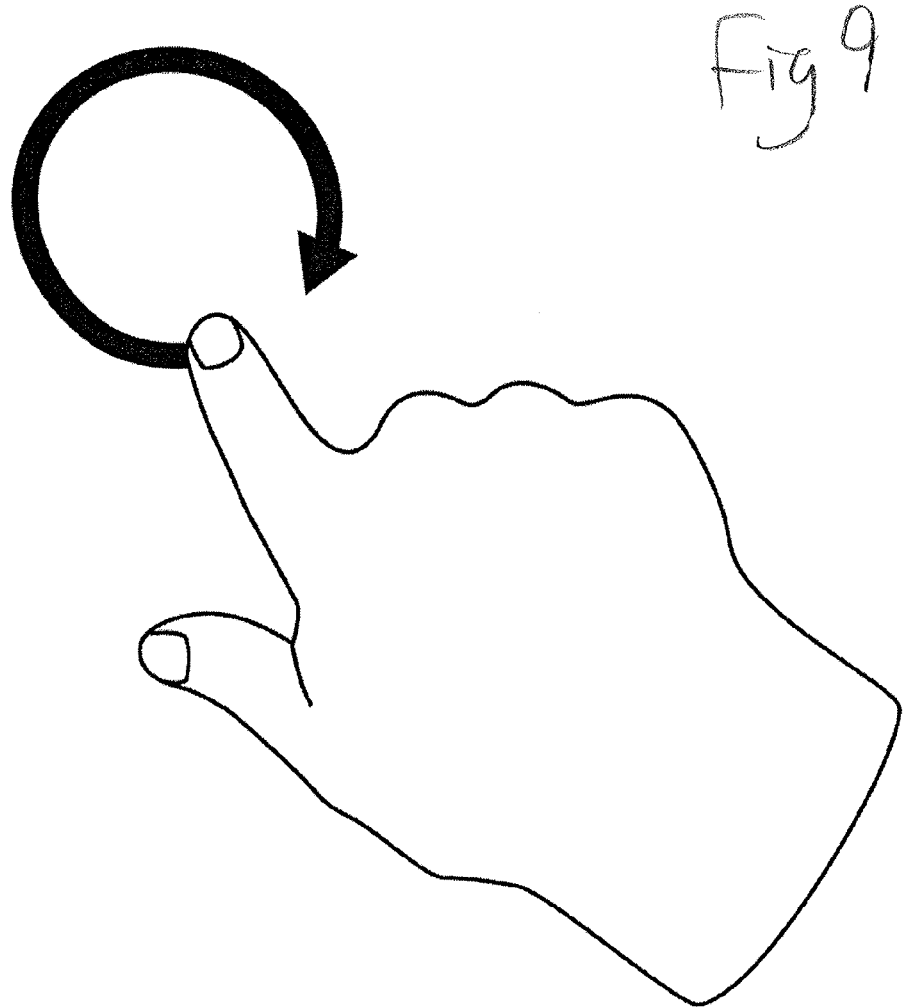
Fig 9

TOUCHLESS INTERACTION DEVICES

This invention relates to electronic devices in which at least some features can be controlled using a touchless sensing interface in which movements of an input object such as a user's hand or finger can be identified by the device through the reflection of signals transmitted from it, particularly ultrasonic signals.

There have now been many proposals for the use of ultrasound to implement a touchless interface in electronic devices such as smartphones, tablets etc. As awareness of the potential of this technology has grown so has the expectation for the performance and range of features which it can provide. However, there is a tension between the introduction of an ultrasound-based touchless interaction capability and the trend in the design of electronic devices for sleek, uninterrupted surfaces. It is difficult to incorporate ultrasonic transducer on the devices without compromising these design principles. The tension is made worse by the wish for greater performance and features since this implies a greater number of transducers which need to be accommodated.

When viewed from a first aspect the present invention provides an electronic device comprising:
a front surface comprising a display screen;
a rear surface;
at least one ultrasonic transmitter; and
at least one ultrasonic receiver,
the device being configured to transmit signals from the transmitter and to receive said signals at the receiver after reflection from an input object and to use said reflected signals to characterise the motion of said input object for controlling a function of the device,
wherein at least one of the ultrasonic transmitter and the ultrasonic receiver is disposed on the rear surface of the device.

Thus it will be seen by those skilled in the art that in accordance with the invention, at least one of the transducers is disposed on the rear surface of the device, thereby reducing the need to provide transducers on the front surface of the device which might otherwise compromise the aesthetic design thereof.

The Applicant has appreciated that even with a transducer on the rear surface of the device, the propagation properties of ultrasound are such that the transmitted signals may still reach and be reflected from the input object and the reflected signals reach the receiver even if one or both of the transmitter and receiver is on the back of the device. This is particularly the case where the input object is to one side of the device rather than directly in front of it such that the device itself acts as a shield. For example, the input object may be outside the projection of the front surface of the device.

In accordance with the invention a single ultrasound channel may be provided. As will be familiar to those skilled in the art, an ultrasound channel comprises a transmitter and a receiver. In a set of embodiments, a plurality of channels is provided. The channels may each have their own dedicated transmitter and receiver, although equally any given transmitter or receiver may be shared amongst two or more channels. In a set of such embodiments, at least one of the transmitter and the receiver for each channel is provided on the rear surface of the device. This could, for example, be a single common transmitter shared between a plurality of channels where the respective receivers are not on the rear surface of the device (e.g. they are on the front surface of the device). Another example would be the provision of a single transmitter on the front or side of the device and a plurality of receivers on the rear of the device corresponding to the respective channels. In a subset of such embodiments, the transducers for all ultrasonic channels are provided on the rear of the device.

As mentioned above, it is generally desirable to be able to accommodate a greater number of transducers in order to give better performance in a touchless interaction system. As will be appreciated, the arrangement of the present invention facilitates this. One particularly advantageous arrangement that has been appreciated by the applicant is the provision of a two dimensional array of transducers on the rear surface of the device e.g. one with a regular mutual spacing between the transducers in both dimensions. Having transducers on the rear of the device is advantageous not only because it makes it easier to accommodate a greater number, but also allows them to be provided over a greater spatial extent than if they had to be fitted around a screen occupying a large proportion of the front of the device.

In a set of embodiments, the transducers comprise ultrasonic receivers.

The Applicant has appreciated that the diffraction of ultrasound signals from a transmitter on the rear of the device or to a receiver on the rear of the device will typically be enhanced by the surface on which the device is being supported. This could, for example, be a user's hand or it could be a support surface on a docking station to which the device is connected. More frequently, however, this could be a surface on which the device is laid to rest, such as a desk or table etc. In a set of embodiments, the rear surface of the device is configured to enhance the diffraction of ultrasound to/from the transducer(s) on the rear when the device is laid with its rear surface facing down onto a flat supporting surface. The rear surface could, for example, be provided with one or more protruding portions which cause the rest of the rear surface to be held away from contact with a flat supporting surface when the device is laid down. The protrusion(s) could be configured to favour diffraction of ultrasound to/from one or more particular directions or maybe effective to enhance diffraction in all directions. Where protrusions are provided as outlined above, it is preferred that the surfaces thereof are continuously curved as opposed to having sharp edges or gradient discontinuities in order to minimise the generation of unwanted artefacts resulting from reflection of ultrasonic signals from the protrusions themselves.

The same effect can be achieved without discrete protrusions e.g. by providing a concave or convex rear surface.

In a set of embodiments, the characterisation of the motion of the input object by the device comprises detecting one of a set of pre-defined gestures carried out by a user's hand.

It will be appreciated from the foregoing that in a set of embodiments the device is able to detect gestures when it is placed on its rear surface on a flat supporting surface such as a table. In a set of embodiments, the device is configured to detect gestures which are executed on the same surface on which the device is laid down. This is particularly advantageous since the gestures are carried out by the user effectively only in two dimensions, which fact may be exploited in processing the received signals. This may make the gesture detection more straightforward. It might, for example, at least partly compensate for the fact that the provision of one or more transducers on the rear of the device, facing the supporting surface such as a table will tend to result in an attenuation of the signal as compared to a 'classic' touchless device in which the transducers are on the front of the device.

The Applicant has further appreciated that the ability to control an electronic device such as a smartphone by the use of gestures executed adjacent to the device when the device is placed on a surface is a particularly strong user benefit. The Applicant has noticed that the standard touch screen interface on modern electronic devices is poorly suited to situations where the user is not firmly gripping the device e.g. when the user wishes to share the content displayed on the screen with another person by placing the device on a table. Attempting to operate a touch screen interface in this way can be frustrating for the user as it can cause the device to move on the table whereas in accordance with some of the embodiments set out above, a user can easily and intuitively carry out gestures on the supporting surface which are similar to those which might be carried out on the device's touch screen, but without having to touch the device (and therefore dislodge or obscure it).

Such arrangements are considered to be novel and inventive in their own right and thus when viewed from a further aspect the invention provides an electronic device comprising a front surface incorporating a display screen, a rear surface, at least one ultrasonic transmitter and at least one ultrasonic receiver, the device being configured to transmit signals from the transmitter and receive said signals at the receiver after reflection from a user's hand and to use said reflected signals to detect one of a predetermined set of gestures carried out adjacent to the device when the device is placed on its rear surface on a flat supporting surface.

In accordance with the invention where it is specified that a transducer is provided "on" a surface this should be understood as including arrangements in which the transducer is fixed into an aperture in the surface, embedded into the surface or provided behind the surface with or without an aperture or apertures providing gaseous communication through the surface.

Certain embodiments of the invention will now be described, by way of example only, with reference to the accompanying drawings in which:

FIG. 1 is a perspective view of the rear of a smartphone;

FIG. 2 is a perspective view of a smartphone being used to track the position of a user's finger;

FIG. 3 is a similar view showing distinction between a finger and a knuckle;

FIG. 5a is a perspective view of the rear of another embodiment of the invention;

FIG. 5b is a side view of the embodiment of FIG. 5a resting on a surface;

FIGS. 7-9 illustrate embodiments in which a device is controlled by gestures carried out at the side.

Figure 4A:
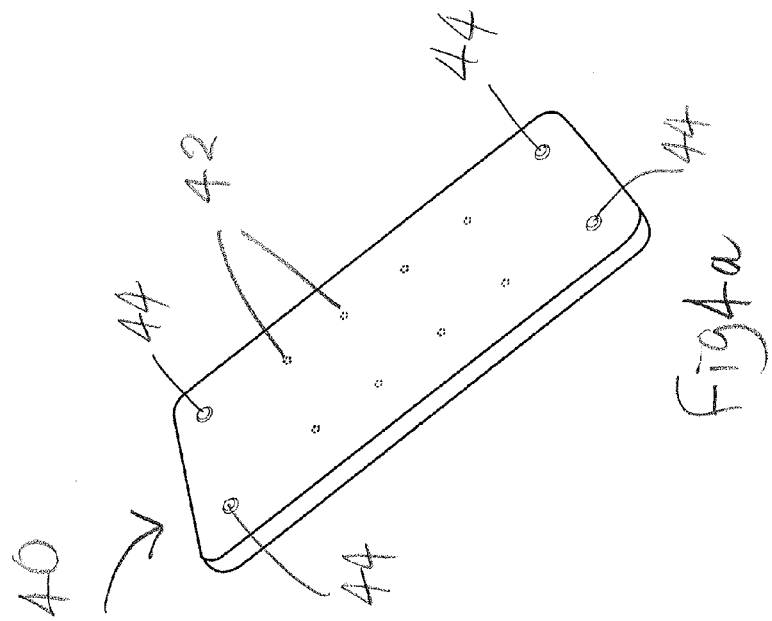
FIG. 4a is a perspective view of the rear surface of another embodiment of the invention.

Turning first to FIG. 1, there may be seen a perspective representation of a smartphone 2. The smartphone 2 has a front surface incorporating a display screen (not visible in FIG. 1) and a rear surface 4 which in this embodiment is generally flat and parallel to the front surface. A narrow side surface 6 separates the front surface from the rear surface 4. It may be seen that mid-way along the long section of the side surface 6 is an ultrasonic loudspeaker 8 which is optimised for producing sound waves at ultrasonic frequencies—e.g. 50 kilohertz or greater. The actual transducer of the transmitter 8 may be provided behind a grille, aperture or array of apertures. Similar arrangements may be provided on the other long portion of the side surface 6 and/or along the shorter top and bottom portions.

Disposed on the rear surface 4 of the device is a rectangular array of receivers 10. As in the case of the transmitter 8, the actual transducers may be behind a grille or aperture(s). The transmitter 8 will be referred to as being on the surface 6 and receivers 10 will be referred to as being on the rear surface 4. This illustrates that these terms should not be given an over-literal meaning.

As FIG. 1 shows, the receivers 10 are arranged in a regular six by three grid and thus there are eighteen of them in total. It will be appreciated that it would not be practically feasible to provide such a large number of receivers on the front surface of a device nor to cover a significant proportion of the surface as is the case with the rear surface 4 in FIG. 1. This embodiment therefore illustrates how a much larger number of transducers may be provided without compromising too much the overall design of the device, particularly the front of it.

The provision of eighteen receivers 10 means that there are at least eighteen distinct ultrasound channels even if only one transmitter 8 is provided. The provision of further transmitters would of course give rise to further multiples of eighteen channels. This relatively large number of potential ultrasound channels means that the touchless performance of the device may be significantly enhanced over that which can be achieved with only one or two ultrasound channels. What the Applicant has discovered is that this remains the case even though the transmitter 8 and receivers 10 are on the "wrong side" of the device for detecting reflections from a user's hand which is generally forward of the front surface.

Operation of the device is illustrated somewhat schematically with reference to FIG. 2. In this figure, the front surface 12 of the device 2 is visible and in particular the outline of the display screen 14 incorporated in the front surface may be seen. Although the rear surface is no longer visible, a representative transmitter 8 prime and two representative receivers 10 prime, provided on the rear surface, are illustrated in dotted lines.

FIG. 2 illustrates a simple mode of operation in which ellipse intersection is used to determine the location of a user's fingertip 16 which allows movement of the fingertip 16 to be tracked over time—i.e. the movement may be characterised. Thus, simplistically, an ultrasound signal 18 such as a pulse or a chirp is transmitted from the transmitter 8' and is reflected from the tip of the user's finger 16 so that the reflected signals 20 may be received at the two receivers 10'. The received signals 20 are processed by the microprocessor inside the device 2 to convert them into digital signals and, if necessary, to apply pulse compression. The processor calculates a time of flight of the signal from the transmitter 8' to the respective receiver 10'. The aforementioned time of flight defines for each receiver 10' a corresponding ellipsoid 22, the focus of which is the associated receiver 10'. The location in space of the user's fingertip 16 may then be taken to be the point at which the ellipsoids 22 intersect. If only two channels were employed as illustrated in FIG. 2, the intersection of the two ellipsoids 22 would in fact be a line and no unique point could be determined although in practice this may be resolved by using one or more additional channels or by using an assumption that the user's fingertip 16 is in the same plane as the device 2, e.g. because the device is placed on a table and the user's fingertip 16 is assumed also to be on the table. This will be discussed further herein below. In this case, the ellipsoids 22 in fact degenerate to ellipses.

FIG. 3 shows a further device 24 embodying the invention and illustrates particularly the advantage which can be achieved through the use of multiple ultrasound channels. As in the previous Figure, the device 24 is oriented so that its front surface 26 is showing and so that the incorporated display screen 28 can be viewed. On the rear surface of the device 24 are a number of transducers forming ultrasound channels, including a first channel comprising a transmitter 30 and a receiver 32 and a second channel comprising a transmitter 34 and a receiver 36. The first channel is physically closest to the user's fingertip 16 and thus the first reflected signal received by the receiver 32 will be the signal reflected from the fingertip 16. By contrast, the first reflection received by the receiver 36 of the second channel will be that reflected from the user's furthest knuckle 38. By taking into account the physical location of the transducers 30, 32, 34, 36 on the rear surface of the device, the signal processing may ascertain more accurately the position and orientation of the user's hand. In particular, it is easier to distinguish between the two different points of reflection 16, 38 which might, with fewer channels, have been misinterpreted as having come from the same point reflector e.g. the user's fingertip 16 which could have led to erroneous results. This Figure illustrates that the increased number of transducers which the embodiments of the present invention facilitate can give a better performance in a touchless interface.

The provision of multiple channels in accordance with embodiments of the invention gives rise to the possibility of using channel selection to improve the performance of movement characterisation as can be demonstrated with reference to FIG. 3. Here, one channel 30, 32 which has the best 'view' of the finger 16 can be selected for tracking with the other channel 34, 36 disregarded or even powered off. Of course if the finger 16 moves towards the second channel 34, 36, this situation may be reversed. This helps to simplify processing as it gives a clearer reflected signal to work with and may also save power.

Figure 4B:
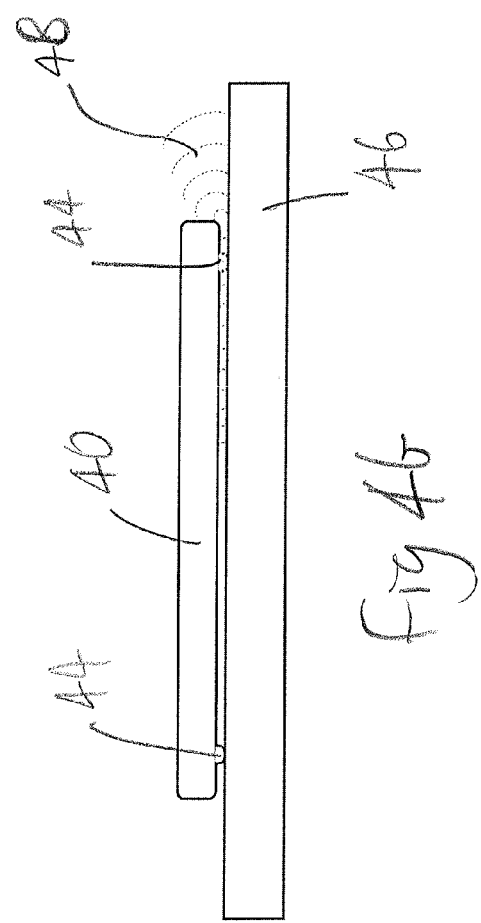
FIG. 4b is a side view of the device of FIG. 4a resting on a support surface.

FIG. 4a shows the rear surface of a smartphone 40 embodying the invention which is similar to the device 2 shown in FIG. 1 in that it has an array of receivers 42 on the rear surface. However, in addition in this embodiment, the device 40 also has a set of protrusions 44 on the rear surface approximately in the corners. As may be seen in FIG. 4b, this means that when the device 40 is placed on a table 46 it raises the rear surface away from the table 46 to enhance the diffraction of ultrasound signals 48 from underneath the device.

FIG. 5a shows a similar embodiment to that shown in FIG. 4a except that instead of discrete protrusions, the rear surface 52 is formed in a convex shape so that when it rests on the table 46 then the centre of the rear surface 52 makes contact with the table, with the edges being raised up (FIG. 5b). In this embodiment the receivers 54 are accordingly arranged differently in a ring around the centre of the rear surface 52.

Figure 6A:
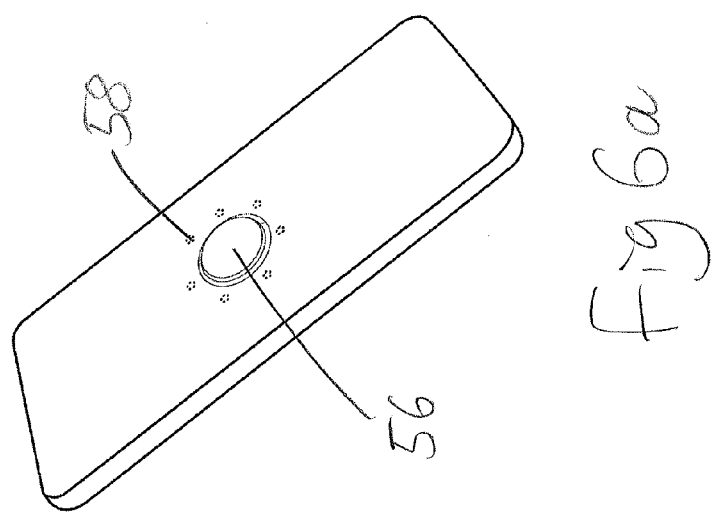
FIG. 6a is a perspective view of the rear of another embodiment of the invention.
Figure 6B:
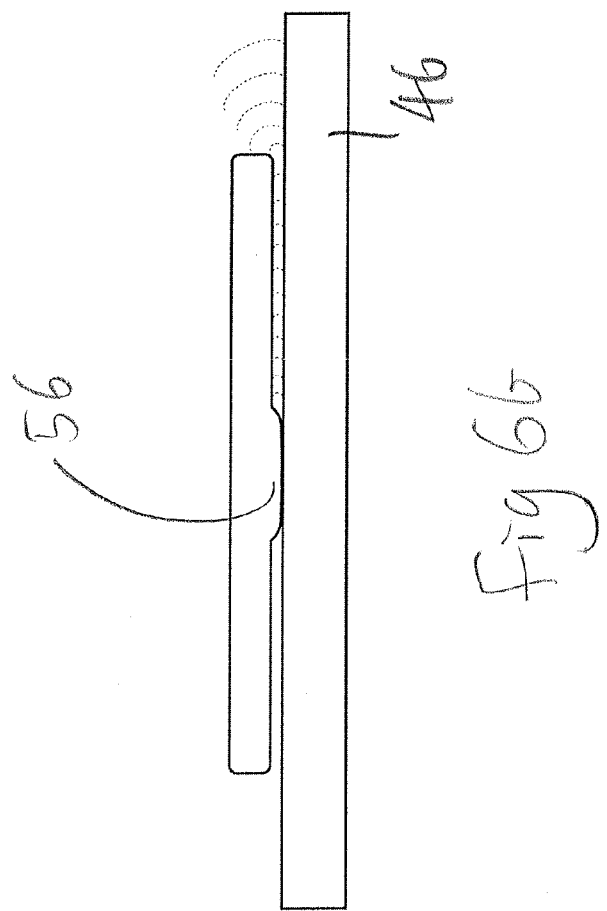
FIG. 6b is a side view of the embodiment of FIG. 6a resting on a surface.

FIG. 6a shows a third similar embodiment in which a discrete central protrusion 56 is provided on the rear surface of a device in order to provide a separation between the receivers 58 and the surface 46 on which the device is placed (see FIG. 6b).

Figure 7:
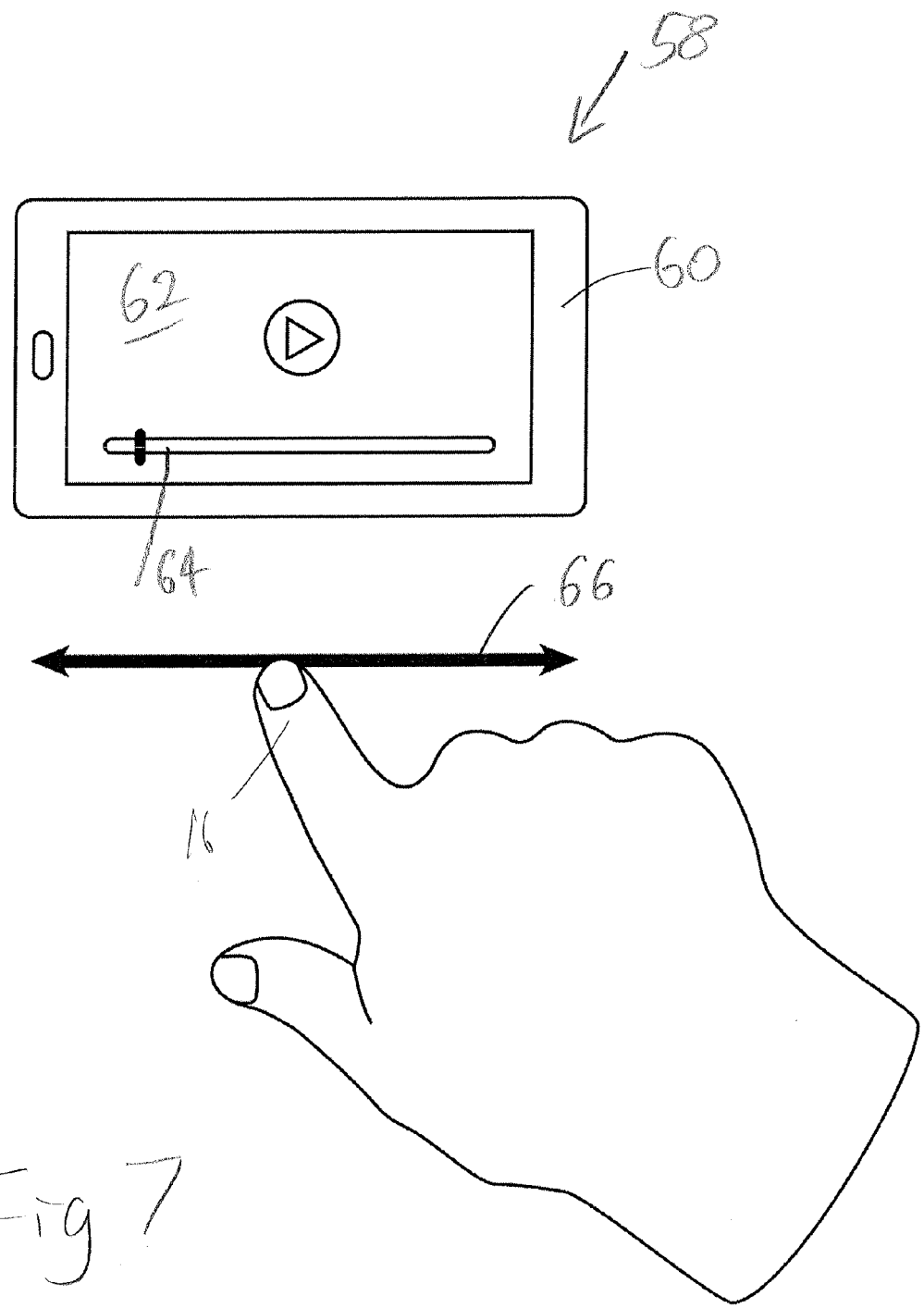

FIG. 7 illustrates one of the advantageous applications of the invention. Here a smartphone 68 is laid on a table (in the plane of the paper) so that its front surface 60 is uppermost, allowing the display screen 62 to be seen—e.g. by a number of people. Shown illustrated on the display screen 62 is a familiar slider widget 64 which is well known in the context of a touch screen interface, e.g. for altering the volume of, or fast forwarding a video. However, in this embodiment the user may slide his or her finger 16 along the table on which the device 58 has been laid along a line 56 parallel to the slider widget 64 on the screen 62 and this may be detected (e.g. using the technique described above with reference to FIG. 2) and used to control the slider 64 without having to touch the screen 62. This makes it much easier to share the contents being shown on the screen 62 with others.

Figure 8:
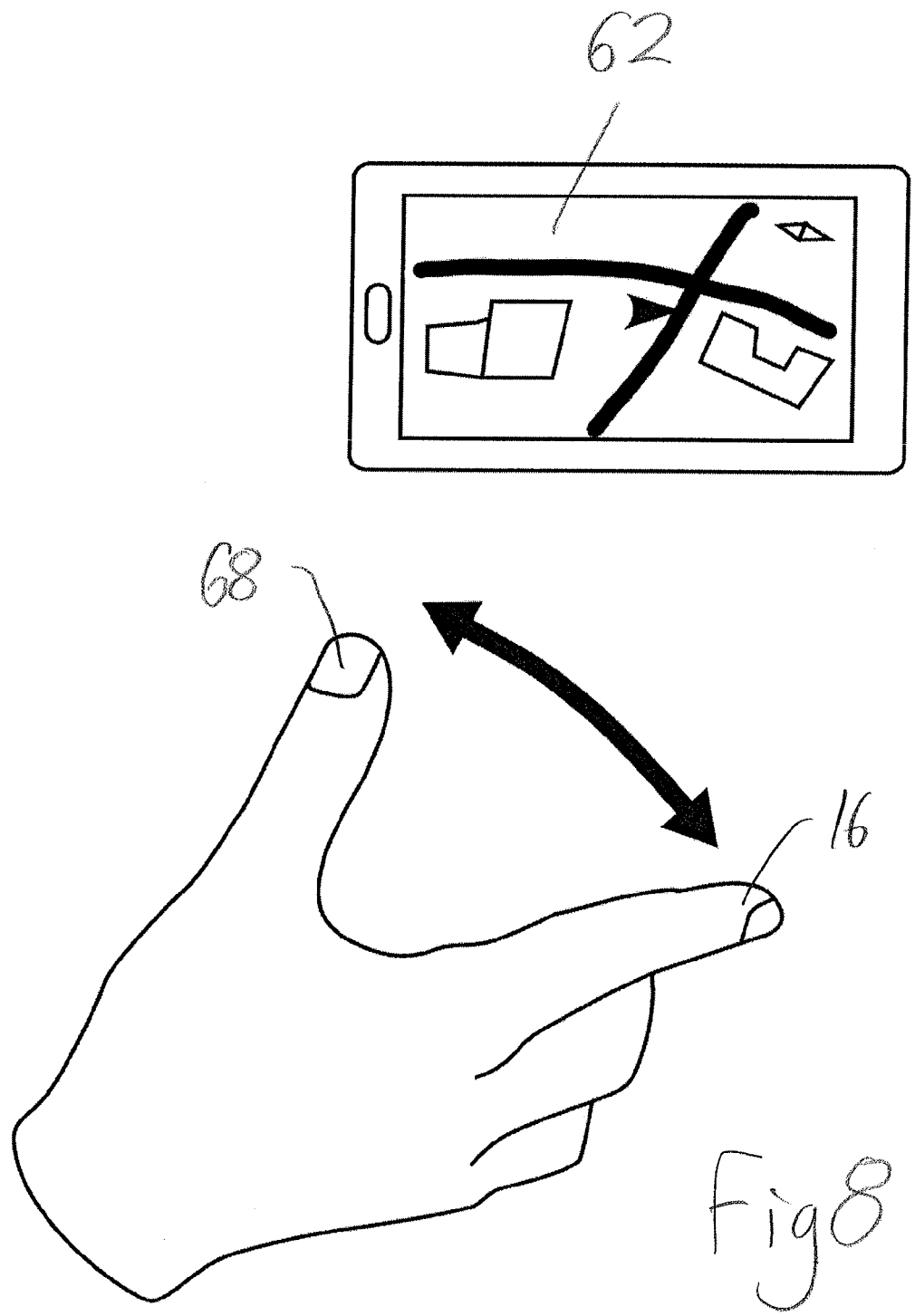

FIG. 8 shows a similar arrangement in which a gesture in which the user's finger 16 and thumb 68 are moved apart in a well-known "unpinch" gesture in order to zoom a map shown on a display screen 62. The provision of a relatively large number of ultrasound channels in accordance with embodiments of the invention allows the finer resolution necessary to be able to track independently the movement of the finger 16 and the thumb 68 in order to be able to recognise this gesture.

FIG. 9 illustrates a further circular gesture which may be executed to the side of a device 70 which has been laid on a table in accordance with the invention in order to manipulate an on-screen object 72.

Figure 10:
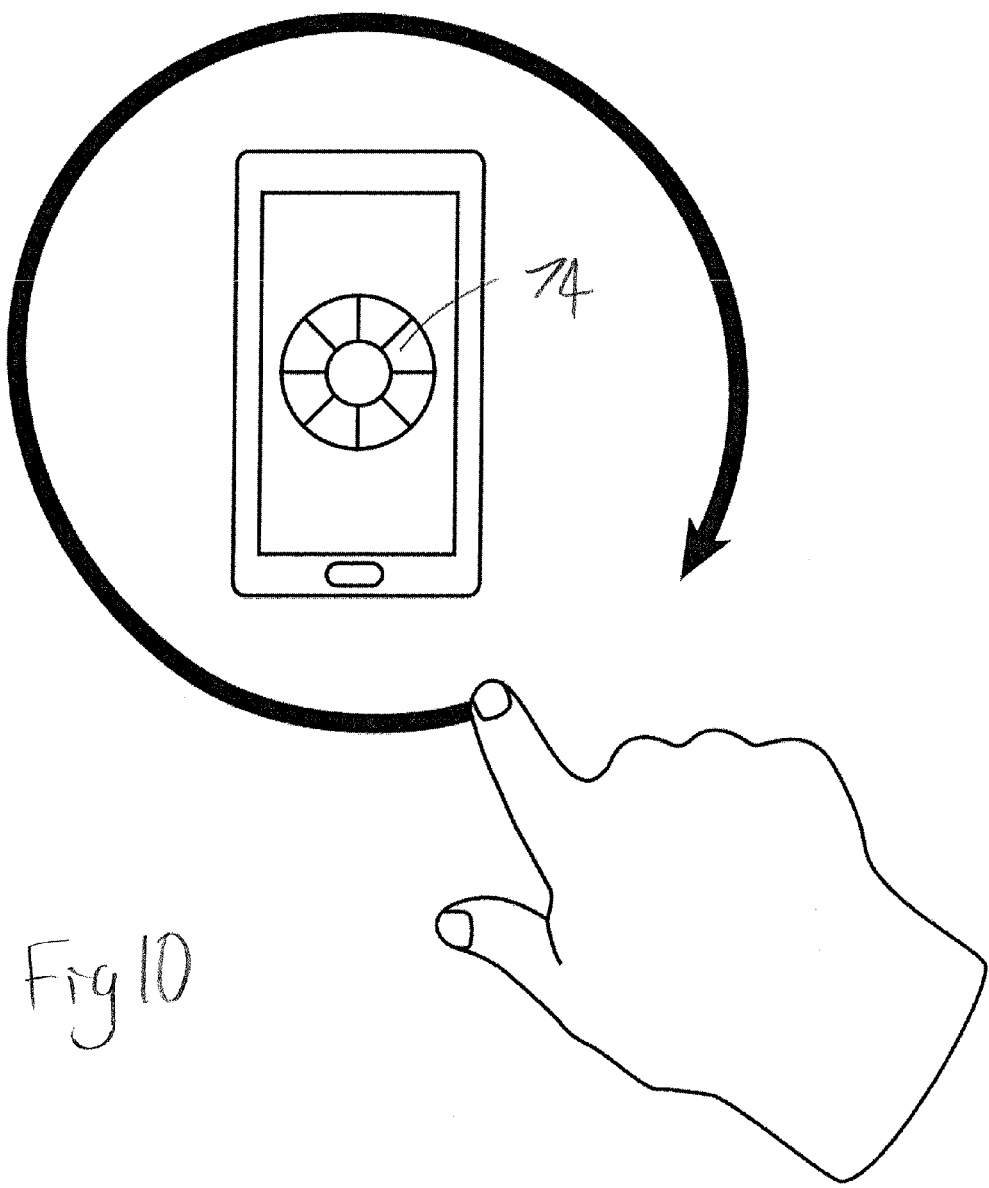
FIG. 10 illustrates control of a device by a gesture carried out all the way round it.

Finally FIG. 10 shows that a much larger circular gesture can also be detected in accordance with embodiments of the invention since in all the arrangements shown ultrasound will diffract from the rear of the device in all directions. The large space around the device available for carrying out this gesture and the resolution available from a relatively large number of channels means that extremely fine control of the on-screen object 74 can be achieved in such an embodiment.

It will be appreciated by those skilled in the art that only a very small number of possible implementations of the principles of the present invention have been illustrated in the drawings and the accompanying description hereinabove. It will be similarly be appreciated therefore that there are many different modifications and variations that may be made within the scope of the invention. For example, it may still be advantageous in accordance with the invention for some transducers to be provided on the front of the device and it will also be appreciated that the number and placement of transducers can also be varied widely according to the particular application.

The invention claimed is:
1. An electronic device comprising:
a front surface comprising a display screen;
a rear surface comprising one or more protruding portions which cause a recessed portion of the rear surface to be held away from contact with a flat supporting surface when the device is laid down;
at least one ultrasonic transmitter; and
at least one ultrasonic receiver,
the device being configured to transmit signals from the transmitter and to receive said signals at the receiver after reflection from an input object and to use said reflected signals to characterise the motion of said input object for controlling a function of the device,
wherein at least one of the ultrasonic transmitter and the ultrasonic receiver is disposed on the recessed portion of the rear surface of the device and is also held away from contact with said flat supporting surface.

2. The electronic device of claim 1 comprising a plurality of channels.

3. The electronic device of claim 2 wherein each of said plurality of channels comprises a transmitter and a receiver and wherein at least one of the transmitter and the receiver for each channel is provided on the rear surface of the device.

4. The electronic device of claim 3 wherein said transmitters and receivers for all ultrasonic channels are provided on the rear of the device.

5. The electronic device of claim 1 comprising a two dimensional array of transmitters and/or receivers on the rear surface of the device.

6. The electronic device of claim 1 comprising wherein said protrusion(s) has/have surfaces which are continuously curved.

7. The electronic device of claim 1 comprising a concave or convex rear surface.

8. The electronic device of claim 1 arranged to characterise the motion of the input object by detecting one of a set of pre-defined gestures.

9. The electronic device of claim 1 configured to detect gestures when the device is placed on said rear surface on said flat supporting surface such as a table.

10. The electronic device of claim 1 configured to detect gestures which are executed on said flat supporting surface on which the device is laid down.

11. An electronic device comprising
a front surface incorporating a display screen,
a rear surface comprising one or more protruding portions which cause a recessed portion of the rear surface to be held away from contact with a flat supporting surface when the device is laid down,
at least one ultrasonic transmitter and
at least one ultrasonic receiver, wherein at least one of the ultrasonic transmitter and the ultrasonic receiver is disposed on the recessed portion of the rear surface of the device and is also held away from contact with said flat supporting surface, the device being configured to transmit signals from the transmitter and to receive said signals at the receiver after reflection from a user's hand and to use said reflected signals to detect one of a predetermined set of gestures carried out adjacent to the device when the device is placed on its rear surface on said flat supporting surface, wherein said signals from said transmitter are reflected from said supporting surface as well as from said user's hand before being received at said receiver.

12. The electronic device of claim 1 comprising a plurality of channels.

13. The electronic device of claim 12 wherein each of said plurality of channels comprises a transmitter and a receiver and wherein at least one of the transmitter and the receiver for each channel is provided on the rear surface of the device.

14. The electronic device of claim 13 wherein said transmitters and receivers for all ultrasonic channels are provided on the rear of the device.

15. The electronic device of claim 11 comprising a two dimensional array of transmitters and/or receivers on the rear surface of the device.

16. The electronic device of claim 11 comprising wherein said protrusion(s) has/have surfaces which are continuously curved.

17. The electronic device of claim 11 comprising a concave or convex rear surface.

18. The electronic device of claim 1 wherein the device is further configured to use said reflected signals when the device is laid down on said flat supporting surface.

* * * * *